United States Patent [19]

Washizuka

[11] Patent Number: 4,639,225
[45] Date of Patent: Jan. 27, 1987

[54] PORTABLE AUDIO-VISUAL ELECTRONIC APPARATUS

[75] Inventor: Isamu Washizuka, Kyoto, Japan

[73] Assignee: Sharp Kabushiki Kaisha, Osaka, Japan

[21] Appl. No.: 506,761

[22] Filed: Jun. 22, 1983

[30] Foreign Application Priority Data

Jun. 24, 1982 [JP] Japan ............................. 57-110167

[51] Int. Cl.⁴ ................................................ G09B 5/06
[52] U.S. Cl. .................................... 434/308; 358/254; 273/148 B; 273/DIG. 28
[58] Field of Search ................... 273/DIG. 28, 148 B; 358/230, 236, 254; 434/179, 178, 308, 335

[56] References Cited

U.S. PATENT DOCUMENTS 4,160,242  7/1979  Fowler et al. ..................... 434/179
4,396,941  8/1983  Nishimura et al. ................ 358/254
4,430,648  2/1984  Togashi et al. ............. 273/DIG. 28

*Primary Examiner*—Leo P. Picard
*Attorney, Agent, or Firm*—Birch, Stewart, Kolasch & Birch

[57] ABSTRACT

A portable general-purpose electronic apparatus which is characterized in that; a memory unit can be inserted into the housing via an inlet so that any desired display information memorized by the memory unit can be displayed on a screen display, and as a result, a variety of information can be conveniently displayed by merely changing the memory unit. Consequently, an extremely useful general-purpose electronic apparatus can be realized by memorizing any desired information, for example, such as game function and other data of interest.

6 Claims, 9 Drawing Figures

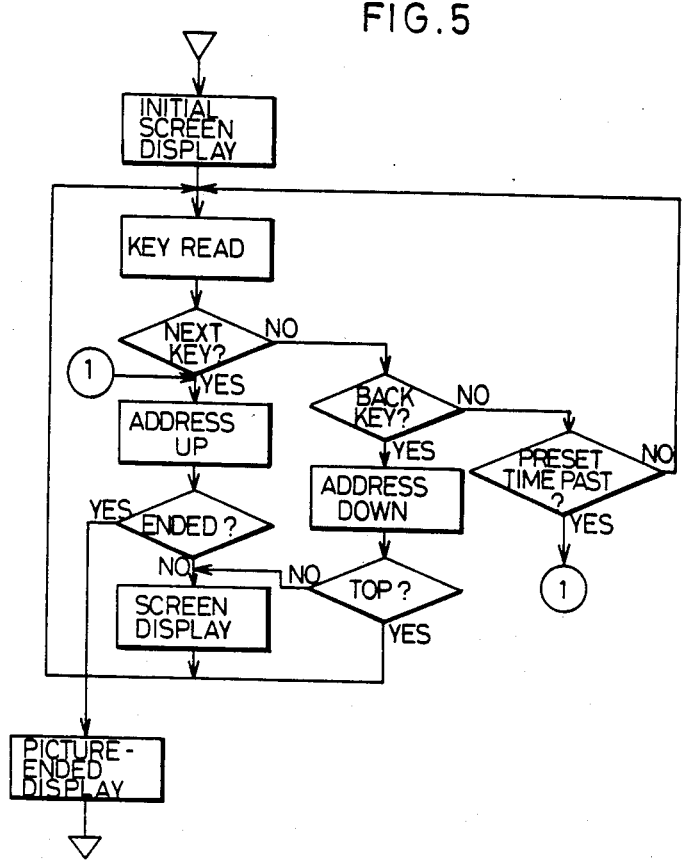
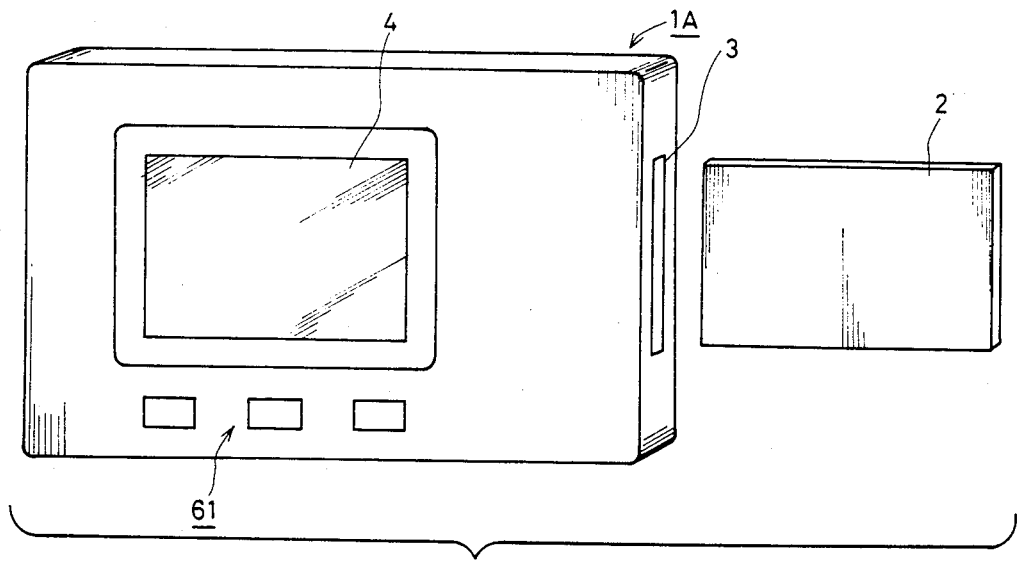

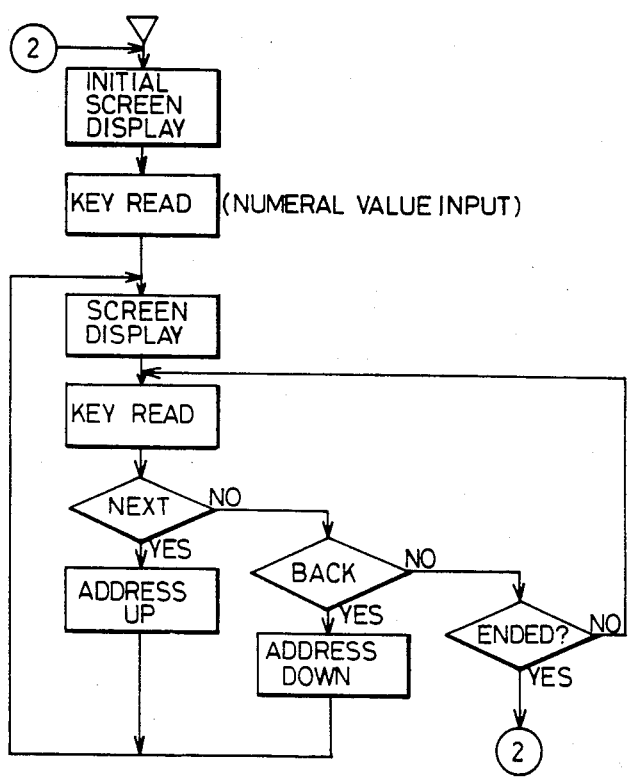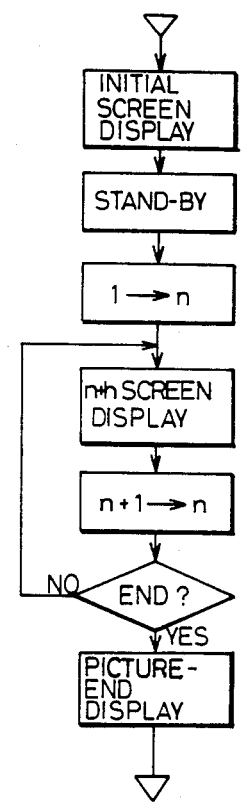

4,639,225

PORTABLE AUDIO-VISUAL ELECTRONIC APPARATUS

BACKGROUND OF THE INVENTION

The present invention relates to a portable general purpose electronic apparatus, more particularly, to a new portable general purpose electronic apparatus capable of displaying memory-stored information on a screen displaying comprising liquid crystal matrix display elements.

Modern semi-conductor memory elements capable of storing large amounts of information in a relatively small space are commercially available at relatively cheap cost. In other technical developments, by densely placing several hundred dots of liquid crystal matrix display elements in the veritcal and lateral directions, such a picture composed of a large numer of dots can be displayed on a compact display unit. Accordingly, despite such a compact size, there are a vriety of electronic calculators and electronic game devices capable of displaying a variety of interesting information. Nevertheless, due to limited functions provided, these devices cannot perform general purpose operations.

SUMMARY OF THE INVENTION

The present invention primarily aims at providing a new portable audio-visual electronic apparatus which is capable of displaying a variety of information by replacing semiconductor memory cards storing a variety of information.

In summary, the present invention comprises a semiconductor memory card for storing the display information, which is sequentially read out of said memory card when it is inserted into the apparatus housing as a sequence of distinct still pictures so that the read-out information can be displayed on a screen display composed of a matrix of display elements.

The primary object, other objects, and characteristics of the present invention will be clearly known by the following detailed description with reference to the drawings attached hereto.

BRIEF DESCRIPTION OF THE DRAWINGS

FIG. 5 shows a flowchart describing practical operations as a preferred embodiment of the present invention.

FIG. 6 shows a flowchart describing operations of a further embodiment of the present invention.

FIG. 7 also shows a flowchart describing operations of a still further embodiment of the present invention, and FIG. 8 shows an external perspective view of another embodiment of the present invention.

DETAILED DESCRIPTION OF THE INVENTION

Figure 1:
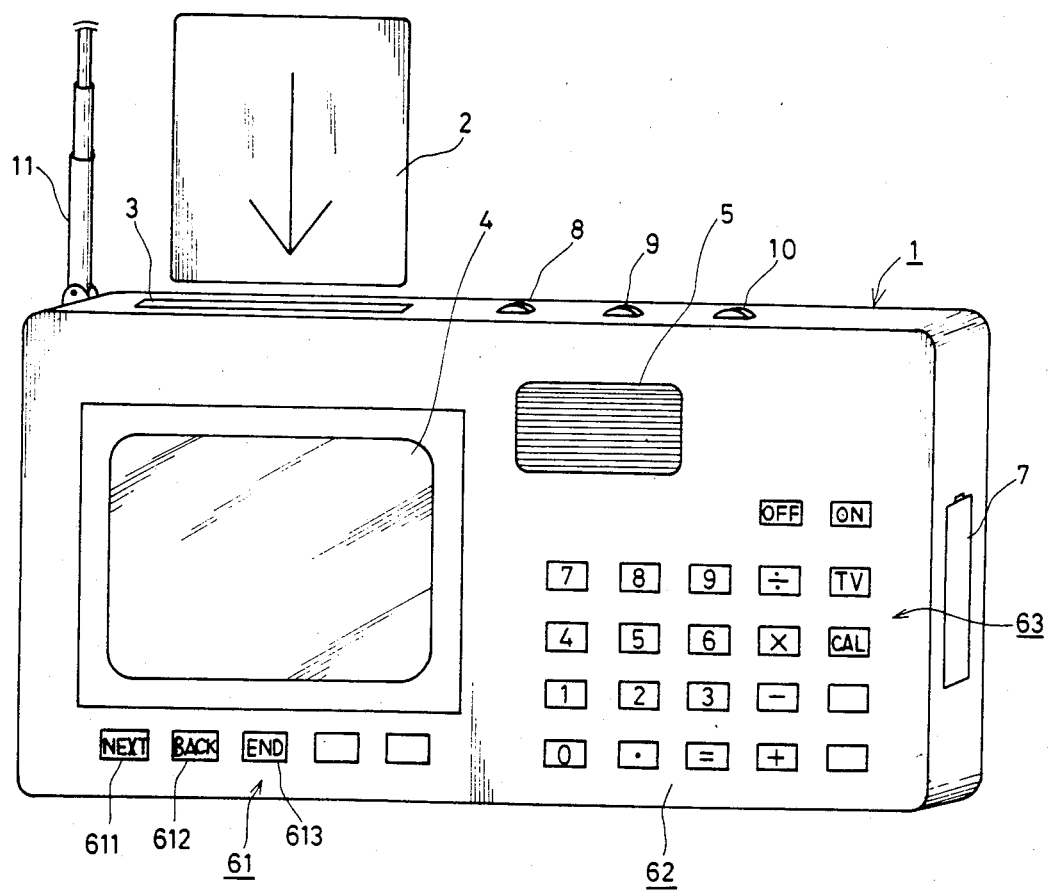
FIG. 1 shows an external perspective view of the new portable general-purpose electronic apparatus as a preferred embodiment of the present invention.
Figure 2:
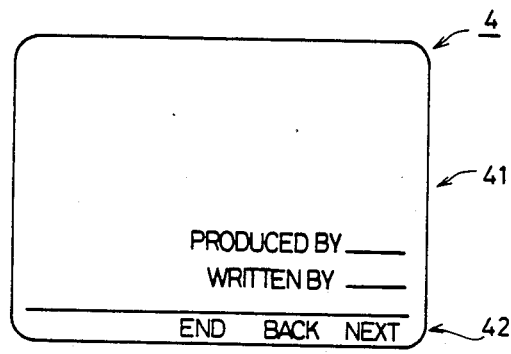
FIG. 2 shows the display unit shown in FIG. 1.

FIG. 1 shows an external perspective view of the new portale general purpose electronic apparatus as a preferred embodiment of the present invention, while FIG. 2 shows the display unit of FIG. 1.

In reference to FIGS. 1 and 2, the present invention is described below. The housing 1 is provided with an insertion slit 3, through which a memory card 2 is inserted. Memory card 2 contains read-only memory (ROM) storing a variety of display information, such as novels, cartoons, or dictionary terms for example. Such a memory card as mentioned above can easily be produced by means of the modern semi-conductor production technologies. The memory card 2 can store speech information in addition to display information. A display device 4 is installed on the front surface of the housing 1, while such a display device 4 is densely provided with several hundred dots both in the vertical and lateral directions. As soon as the memory card 2 is inserted into the memory card inlet 3, a display information is read out of memory card 2 for display on the screen. As shown in FIG. 2, information such as of any literary work, producer or author's name, may be displayed in the initial condition of the display area 41 of the display device 4, with the key function data of the key input selector 6 displayed in the display area 42. The housing 1 also contains a TV tuner (not illustrated), with which a TV picture can be received from any broadcast station and can be displayed on the display screen.

The housing 1 also provides an audio output 5 and a key input selector 6 on its front surface. The audio output 5 includes, for example, a speaker, through which speech information read out of the memory card 2 can be pronounced, and if a TV broadcast signal is received by said TV tuner, a speech can be pronounced. The key input selector 6 comprises a picture select key 61, ten-key unit 62 and a function key 63. The picture select key 61 comprises the NEXT key 611, BACK key 612, and the END key 613. The NEXT key 611 is operated to display the next picture. The BACK key 612 is operated to display any picture again immediately after it is displayed once. The END key is operated to display the final scene of the picture played back. The ten-key unit 62 also includes digital keys to input digital values and calculation keys to perform arithmetic operations. The function key 63 switches the operative mode of the electronic apparatus into either the TV mode, the calculator mode or the information display mode.

A connector 7 is provided on the lateral surface of the housing 1, enabling the electronic apparatus to be electrically connected to external devices such as a cassette tape recorder that can be used for memory means. The upper surface of the housing 1 is provided with a tuning knob 8, contrast adjustment knob 9, audio volume adjustment knob 10, and an antenna 11, that are needed for the TV receiver unit.

If the operator desires to view a TV broadcast program while the display information of the memory card 2 is being displayed at the display screen 4, the TV key which is part of the function key 63 should be pressed, and then a TV broadcast picture will be shown on the display screen 4, while the audio output 5 outputs speech. If the calculation key which is also part of the function key 63 is pressed, digital value data inputted by the digital key 62 along with calculation results can be displayed on the display screen 4.

Figure 3:
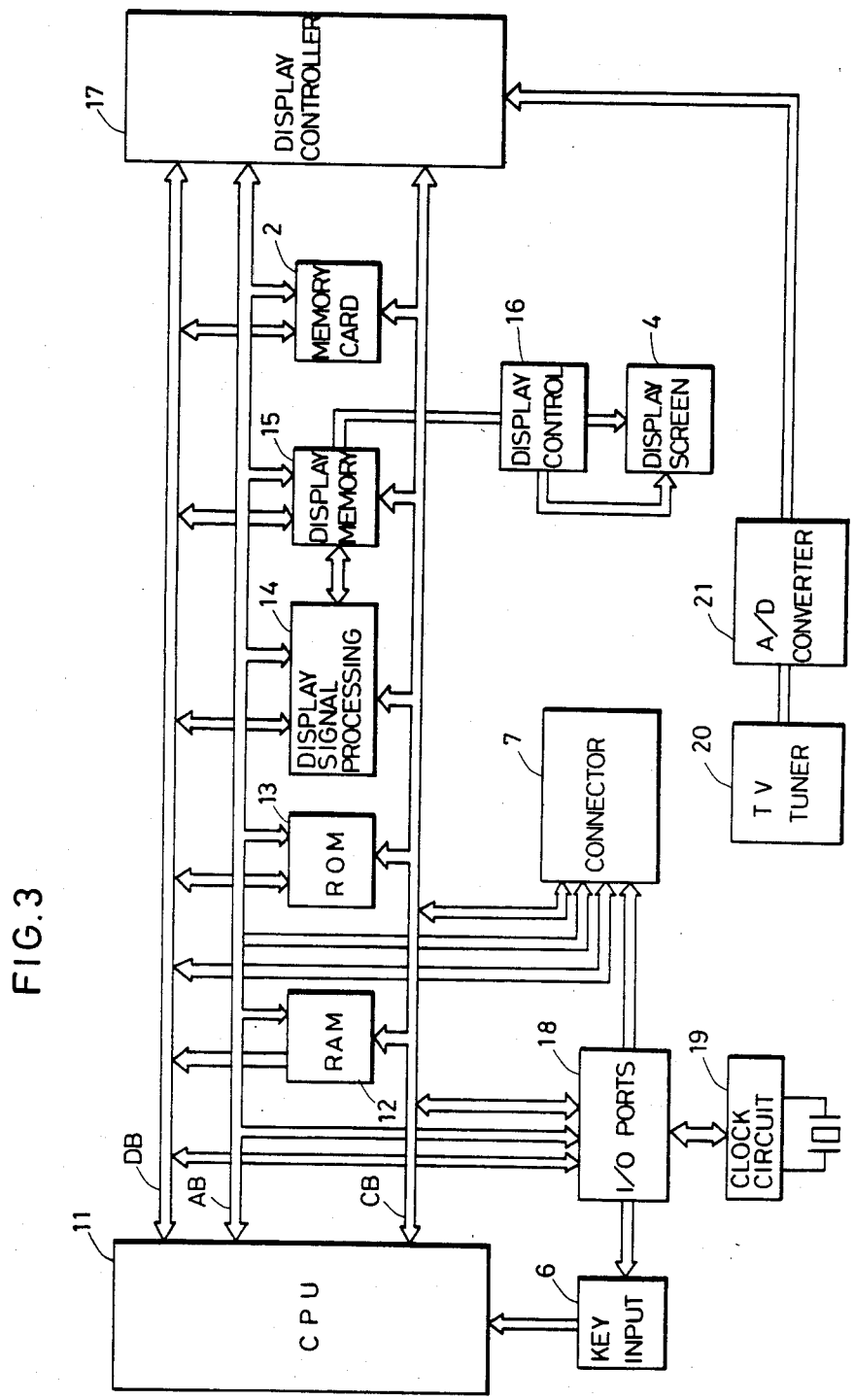
FIG. 3 shows a simplified block diagram of the new portable general-purpose electronic apparatus as a preferred embldiment of the present invention.

FIG. 3 shows a simplified block diagram of a preferred embodiment of the present invention. Next, construction of the preferred embodiment is described below. Data bus DB, address bus AB and control bus CB, are respectively connected to the CPU 11, while these buses are also connected to a random access memory (RAM) 12, ROM 13, display signal processing circuit 14, display memory 15, display controller 17, I/O port 18, connector 7, and the memory card 2. RAM 12 memorizes registers and flags, whereas ROM 13 stores programs. Display memory 15 memorizes the positions of dots on the display screen 4 in responding to several bit data. Display signal processing circuit 14 reads out the display data from the display memory 15 according to the display control timing before said data is sent to the display control circuit 16. In responding to the input display data, the display control circuit 16 displays said data on the display screen 4. I/O port 18 is connected to the key input 6, and so the I/O port 18 outputs a key strobe signal to the key input 6, which then feeds a key return signal to the CPU 11. I/O port 18 is also connected to the clock circuit 19 which counts the actual time and the control timing as well. I/O port 18 receives a variety of data from, and sends out these data to, external devices via connector 7. Display controller 17 controls both the display signal processing circuit 14 and the display memory 15. The TV tuner 20 is connected to the display controller 17 via the A/D converter circuit 21. The TV tuner 20 receives the TV broadcast signal and feeds video signals to the A/D converter circuit 21, which then coverts the video signals into digital signals for delivery to the display controller 17.

If the TV mode is selected by pressing the TV key, which is part of the function key 63, the display controller 17 then writes the digital video signal into the display memory 15 according to the timing counted by the clock circuit 19.

Although not illustrated, in order to enable the audio output 5 to pronounce speech, both the speech ROM and the speech synthesizing circuit are connected to the CPU 11.

Figure 4:
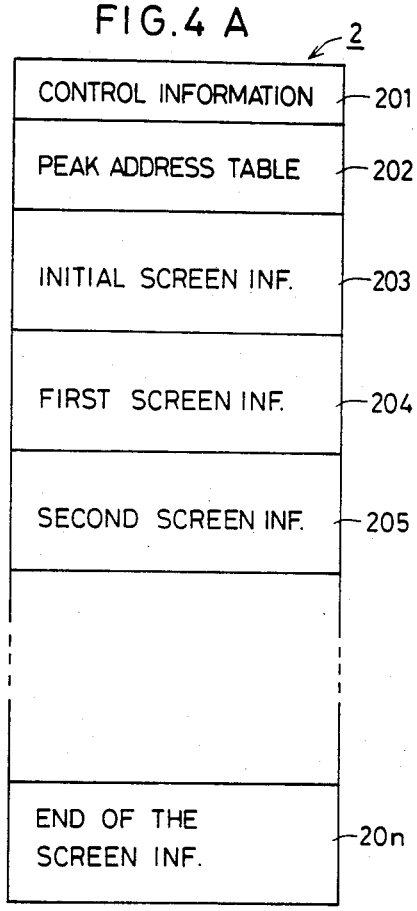
FIGS. 4A and 4B respectively show typical data to be stored in memory cards.
Figure 4:
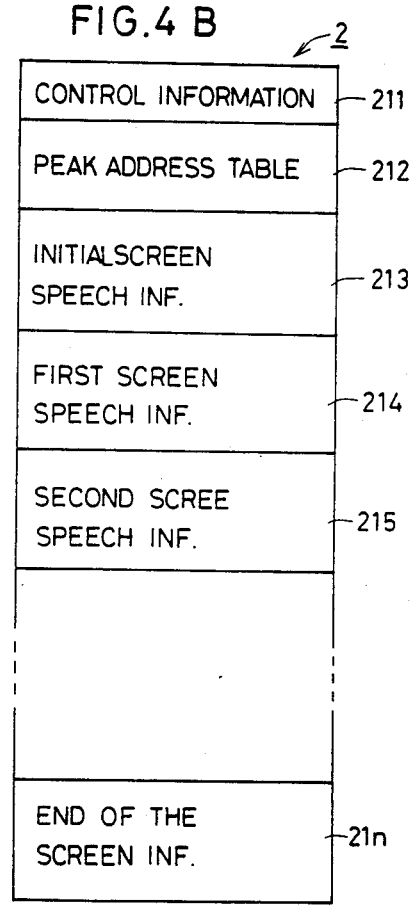

FIGS. 4A and 4B respectively show typical data momorized by the memory card 2. First, in reference to FIG. 4A, the memory card 2 contains memory area from 201 to 20n. Control information 1 is memorized by the memory area 201, while the peak address table is memorized by the memory area 202, and the screen data are memorized by the remaining memory areas 203 to 20n. The memory card 2 characteristically uses the control information 1 to properly read out the screen information. The peak address table memorizes the peak address of the memory area where the information for each screen is memorized. Partition codes are inserted into the portions whereby the screen information memorized by the memory areas 203 to 20n is properly separated.

FIG. 4B shows that the memory card 2 not only memorizes the screen information, but also the speech information as well. Memory area 211 memorizes the control information specifically controlling the use of the screen and speech data. Memory area 212 memorizes the peak addresses of each screen's speech data. Memory areas 213 to 21n respectively store the screen and speech data.

FIG. 5 is a flowchart showing an example of operations needed to display pictures using the memory card 2.

Next, in reference to FIGS. 1 through 5, typical operations of a preferred embodiment of the present invention are described below. The memory card 2 in this embodiment stores a variety of screen data such as novels and/or comics. First, the memory card 2 is inserted into the memory card inlet (slit) 3, enabling the CPU 11 to activate the display controller 17 so that the data can be read out from the memory card 2. In responding to the control data 1 memorized by the memory card 2, the display controller 17 first reads out the initial screen data, which is then converted into data corresponding to each dot of the display screen 4 by the display signal processing circuit 14. After these data are repositioned so that they match with each dot, they are memorized by the display memory 15, and finally the contents of the display memory 15 will be displayed on the display screen 4 by the display control circuit 16.

Next, data on the screen corresponding to switching key 61, which is part of the key input selector 6, is read. I/O port 18 feeds the key strobe signal to the key input selector 6, and if the NEXT key 611 is pressed, the key return signal responding to the pressed key is fed to the CPU 11, which then identifies that the NEXT key 611 is pressed and informs the controller 17 that the NEXT key is being pressed. The display controller 17 designates the memory area 204 by advancing the addresses of the memory card 2. Then, the first screen information is read out of the memory area 204, which is then displayed on the screen 4. If the END key 613 is pressed, the end-of-picture information is read out of the final memory area 20n of the memory card 2 before this information is displayed on the screen 4. If the BACK key 612 is pressed, the display controller 17 lowers the addresses so that the screen data that immediately preceded the instant displayed picture can be displayed again. If the BACK key 612 is repeatedly pressed, such preceding pictures can be sequentially displayed. If the pictures are reversed to the first scene, no back operation can be performed, entering a stand-by mode until the next key operation is executed. Unless any of the functional keys is operated within a certain period of time, the display controller 17 automatically advances the addresses so that the ensuing pictures can be displayed. Such a pre-determined time is counted by the clock circuit 19. Although there is no illustration as to the audio output processing in FIG. 5, using the memory card shown in FIG. 4B, any desired speech based on the speech information can be pronounced by the audio output 5.

FIG. 6 shows a flowchart describing operations of another embodiment of the present invention. In this embodiment, index words and these descriptions as a dictionary are stored in the memory card 2 as a plurality of the integrated picture information, while any of these can be displayed by pressing any of the pre-designated ten keys. More particularly, if the memory card 2 is inserted into the memory card inlet slit 3, the initial picture is displayed on the screen 4 as was done by the procedures shown in FIG. 5. Such an initial picture displays, for example, initials of the index words by digitally designating them. Typically, if a certain digital value corresponding to any desired index initial is input by pressing the ten key 62, a key code signal corresponding to the operated digital value key will be sent to the display controller 17, which then reads the relevant picture information containing an index corresponding to the designated digital value from the memory card 2 before said information is displayed on the screen 4. If the NEXT key 61 is pressed, the address will advance to cause the relevant picture information to be read out of the next memory area of the memory card 2, and finally said picture information will be displayed on the screen 4. Conversely, if the BACK key is pressed, the address will be brought backward to cause the picture information that preceded the instant displayed picture to be read for display on the screen 4. If the END key 613 is pressed to terminate the scanning for any desired index, the unit enters the initial state once again, causing the initial picture information to be displayed.

FIG. 7 shows a flowchart describing operations of a still further embodiment of the present invention. This embodiment aims at displaying information of any movable picture using movable picture information such as animated cartoons stored in the memory card 2.

First, an initial picture information is read out of the memory card 2 for display on the screen 4. Simultaneously, the clock circuit 19 starts the time counting, and as soon as the CPU 11 identifies that a pre-determined time has been counted by the clock circuit 19, the CPU sends this information to the display controller 17. On receipt of this, the display controller 17 advances the addresses in order to read the next picture information from the memory card 2, which is then displayed on the screen 4. Whenever the pre-determined time elapses, the display controller 19 sequentially advances the addresses of the memory card 2 to display the picture information in succession. As soon as the final scene is identified, the end-of-the-picture information is displayed to terminate series of the operation.

When displaying a variety of information containing motion pictures such an animated cartoons, instead of using a memory card 2 having a relatively large capacity usually needed for displaying such motion pictures, compressed picture information may be stored in the memory card 2. To achieve this, the picture information may be memorized by the memory card 2 without remaining as the pictures themselves, but by selectively storing only those variable scenes between the preceding and the ensuing pictures in the memory card 2. This is particularly effective when displaying animated cartoons, since only limited portions of the pictures are varying in the scene.

FIG. 8 shows an external perspective view of a still further embodiment, which enables the screen 4 to display only the picture information read from the memory card 2, and said embodiment deletes all of the electronic calculator, TV receivor set, and the speech output functions, providing users with easier portable conveniences.

The present invention thus described in reference to the annexed drawings will obviously be suggestive of any derivation or modification from the spirit and scope described therein by those skilled in the arts. However, it should be understood that the present invention is not limitative of the spirit and scope thus described, but is intended to solely include all of such derivations and/or modifications within the spirit and scope of the following claims.

What is claimed is:

1. A portable audio-visual electronic apparatus having at least three operational modes, including a first mode displaying still display information, a second made displaying a moving picture from still display information and a third mode displaying television signals, comprising
   (a) means for visually displaying information including screen display means composed of a matrix of display elements;
   (b) a semiconductor memory card for storing a sequence of distinct screens of still display information;
   (c) a housing in which said screen display means is disposed and inlet lot in which said semiconductor memory card may be inserted;
   (d) display control means in said housing for sequentially displaying said screens of still display information stored on said memory card on said screen display means after the memory card is inserted into said housing via said inlet slot when the apparatus is in the first mode, said display control means being capable of automatically sequencing said still display information in rapid succession to create the appearance of moving pictures on said screen display means when the apparatus is in the second mode;
   (e) receiver means in said housing for receiving T.V. broadcast signals and outputting video signals; and
   (f) mode selection means including a T.V. selection key for selecting video signals from said received means when the apparatus is in the third mode;
   said display control means, in response to the actuation of said T.V. selection key, displaying said video signals on said screen display means rather than said still display information.

2. The portable electronic apparatus of claim 1, wherein said display control means includes a keyboard with manually actuable command keys for selectively sequencing each screen of still display information in a forward or reverse direction.

3. The portable electronic apparatus according to claim 1 wherein,
   said memory card also stores audio information;
   said control means reads said audio information from said memory card; and there is further provided an audio speaker for outputting said audio information.

4. The portable electronic apparatus according to claim 3 wherein,
   said receiver means also receives and outputs audio signals; and
   said control means in responding to the operation of said TV channel selection key outputs audio signals from said receiver means rather than from memory card.

5. The portable electronic apparatus of claim 3, wherein said audio information is speech.

6. The portable electronic apparatus according to claim 1 further including;
   digital keys for inputting digital values and calculation keys for commanding calculations; and calculation means for calculating digital values input in response to the operation of said digital and calculation keys; and
   said control means enables said screen display means to display the results of calculations executed by said calculation means.

* * * * *